United States Patent
Man

(10) Patent No.: US 12,061,882 B2
(45) Date of Patent: Aug. 13, 2024

(54) MACHINE-LEARNING ASSISTED AUTOCOMPLETE IN VISUAL PROGRAMMING

(71) Applicant: Electronic Arts Inc., Redwood City, CA (US)

(72) Inventor: Siu Yee Man, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/886,372

(22) Filed: May 28, 2020

(65) Prior Publication Data

US 2021/0373857 A1 Dec. 2, 2021

(51) Int. Cl.
*G06F 8/34* (2018.01)
*G06N 20/00* (2019.01)

(52) U.S. Cl.
CPC .............. *G06F 8/34* (2013.01); *G06N 20/00* (2019.01)

(58) Field of Classification Search
CPC ........... G06F 8/34; G06F 17/18; G06N 20/00; G06N 5/04; G06N 3/08; G06Q 20/4016
See application file for complete search history.

(56) References Cited

U.S. PATENT DOCUMENTS

| | | | |
|---|---|---|---|
| 9,239,722 B1 * | 1/2016 | Calahan | G06F 8/34 |
| 10,761,813 B1 * | 9/2020 | Echeverria | G06N 5/04 |
| 2007/0219000 A1 * | 9/2007 | Aida | G07F 17/32 |
| | | | 463/42 |
| 2019/0303466 A1 * | 10/2019 | Khurana | G06F 8/71 |
| 2020/0104102 A1 * | 4/2020 | Brockschmidt | G06N 3/08 |
| 2020/0176113 A1 * | 6/2020 | Megerian | G16H 10/60 |
| 2021/0132913 A1 * | 5/2021 | Singh | G06F 8/33 |
| 2021/0133014 A1 * | 5/2021 | Agarwal | G06F 11/0769 |
| 2021/0150285 A1 * | 5/2021 | Breedvelt-Schouten | |
| | | | G06K 9/6224 |
| 2021/0232627 A1 * | 7/2021 | Schuckle | A63F 13/23 |

OTHER PUBLICATIONS ("Suggested Blocks: Using Neural Networks To Aid Novice Programmers In App Inventor", Maja Svanberg, May 2018) (Year: 2018).*

* cited by examiner

*Primary Examiner* — Chat C Do
*Assistant Examiner* — Noor Alkhateeb
(74) *Attorney, Agent, or Firm* — Lee & Hayes, P.C.; Bea Koempel-Thomas

(57) ABSTRACT

A visual-programming tool accesses a datastore of existing program data, which includes program code associated with a plurality of programs, (e.g., games), stored as multi-layer trees of nodes with logical connections signifying relationships between nodes of adjacent layers. The tool uses machine learning to determine multi-layer trees of predictions including at least one chain of nodes from the multi-layer tree of nodes. The tool provides one or more of the multi-layer trees of predictions including chains of nodes for presentation via a graphical-user interface and receives a gliding gesture input indicating a decision between nodes of the one or more layers. The input indicates a decision associated with selecting a chain of nodes when the input traverses more than one layer. The visual-programming tool provides further layers from the one or more multi-layer trees of predictions based on the received input without requiring acceptance of individual nodes at each layer.

20 Claims, 5 Drawing Sheets

MACHINE-LEARNING ASSISTED AUTOCOMPLETE IN VISUAL PROGRAMMING

BACKGROUND

Traditional autocomplete tools as used in integrated development environments (IDE) are too unwieldly for use in visual programming. Conventionally, autocomplete algorithms filter based on context, providing an extensive list of valid options based on type matching. Conventional filtering based on type matching results in too many options to be nimble for use in visual programming. The developer must either scroll through the extensive list returned by traditional autocomplete, searching for a suitable option, or the developer must provide more search terms to further filter the extensive list down to a more manageable size. Thus, these conventional autocomplete tools are unacceptably stilted and too slow for use in visual programming because they only produce options for the next immediate step. Traditional autocomplete tools require the developer to traverse a lengthy list of options or stop to further filter at each step. Moreover, since the known autocomplete tools rank suggestions based on recent history, listing the most recently accepted suggestion first, the conventional autocomplete tools are often of little to no help for new projects, which will not have existing data with which to start.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
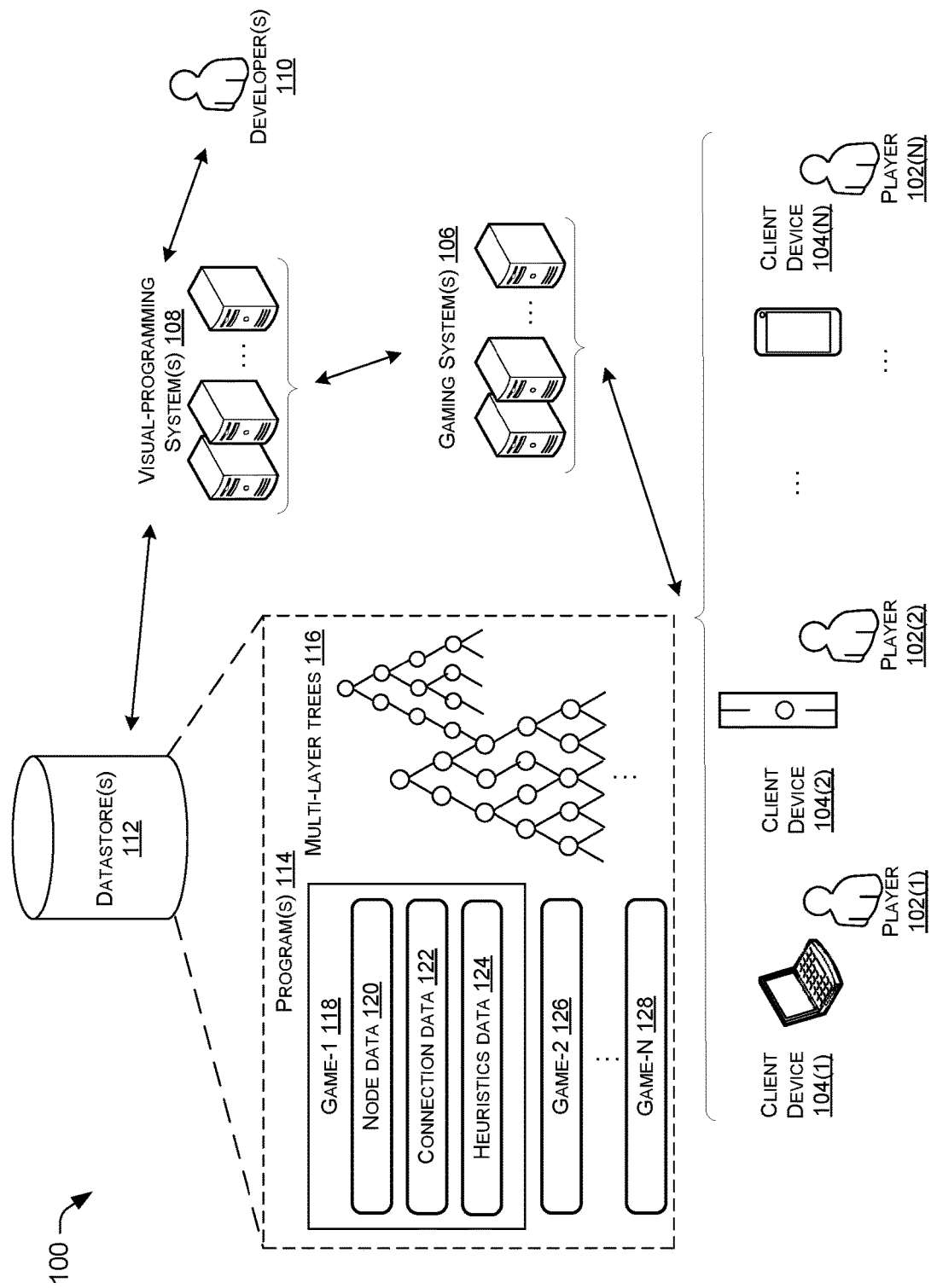
FIG. 1 illustrates an example operating environment for machine-learning assisted autocomplete in visual programming in accordance with examples described herein.

Examples in this disclosure describe techniques, e.g., methods, apparatuses, computer-readable media, and/or systems, for machine-learning assisted autocomplete in visual programming. Such machine-learning assisted autocomplete can be used for visual programming of video games as well as other programming. For example, the visual-programming system described herein can improve programming speed for any development program code including games in development, whether the programs, (e.g., games, etc.), in development are brand new programs, (e.g., games, etc.), updates to existing programs, (e.g., games, etc.), or new versions of existing programs, (e.g., games, etc.). Video game designers, and other programmers, can use machine-learning assisted autocomplete in visual programming tools as described herein to expedite program development and to reduce time spent debugging compared to traditional textual programming or current visual programming tools. In addition to reducing the time spent on initial program development and coding, reducing time spent identifying errors in program code can help improve a time-consuming task for designers and testers. Correcting such errors is not only necessary for execution of the code but is also necessary to have the code cause a computing and/or gaming system to perform as desired during program execution including game play. Use of conventional visual-programming tools has become widespread in part because they can help eliminate simple errors that typically occur in textual programming like misspelled identifiers and operators. Conventional visual-programming tools can also help avoid errors in programming logic, but to date their usefulness in this realm has been limited because they have been too unwieldly. Reducing the time it takes developers to produce code with less errors is therefore desirable.

The machine-learning assisted visual-programming tool described herein can employ machine learning to provide autocomplete options in an intuitive visual-programming graphical-user interface. The machine-learning assisted visual-programming tool described herein can leverage existing programming from a variety of programs, (e.g., including games, etc.), enhanced by machine learning to determine which autocomplete options to show the developer. The machine-learning assisted visual-programming tool described herein employs one or more autocomplete algorithms that can provide flexible chains of nodes programming code. The machine-learning assisted visual-programming tool described herein can employ the autocomplete algorithms to facilitate the developers' fluid acceptance of one or more nodes in the chains of nodes of programming code. In contrast, conventional autocomplete algorithms, require that the developer select from a lengthy list of valid code options at each step. These conventional tools are unacceptably stilted and slow in use because they only produce options for the next immediate step. The conventional options require the developer to search through a lengthy list of options, or the conventional options require the developer to stop to further filter at each step.

The machine-learning assisted visual-programming tool described herein can leverage existing programming from a variety of programs, e.g., including games, that can be stored in a local-secure repository and/or can be stored in a cloud-based repository. Sharing programming from one or more of these repositories among teammates and/or across development projects can leverage the increased amount of information and diversity of the information to improve predictions from the autocomplete algorithm. In some cases, this shared volume and variety of information can be particularly helpful such as when a teammate is new or when there is not a history associated with the particular program. For example, when a teammate is new there will not be a local history with a particular program, (e.g., game), for the teammate to build on. In various examples, when a teammate, new or not, is starting to code a new program, (e.g., game), machine-learning assisted autocomplete in the visual programming tool can leverage shared programming that would not otherwise be available to provide code options.

In some examples, machine-learning assisted autocomplete in the visual programming tool can leverage such shared programming based on one or more heuristics. Heuristics used by the machine-learning assisted autocomplete in the visual-programing tool can include properties of the development project and/or characteristics of or associated with the developer to limit the code options provided without requiring that the developer provide filter input at each separate step. For example, properties of the development project can include game genre, game-play similarity, a type of graph representing the game or aspects of the game, etc. In some examples, machine-learning component(s) associated with the machine-learning assisted visual-programming tool can automatically identify similarities in programming, (e.g., gaming, etc.). In gaming, the machine-learning components can identify that scoring is similar in basketball, soccer, hockey, etc., while recognizing that scoring is different in baseball, for example. Characteristics of the developer can include user role, e.g., engineer, game-play designer, audio-effects designer, visual-effects designer, artist, etc. Developers can have multiple roles. In some examples, machine-learning component(s) associated with the machine-learning assisted visual-programming tool described herein can automatically identify characteristics of the developer based on logon information and/or by accessing a related datastore, e.g., an employee record, etc.

Thus, the machine-learning assisted visual-programming tool can provide code options tailored to the particular development program, (e.g., game), and/or the role of the developer at the time. Instead of providing code predictions for only the next immediate step, the machine-learning assisted visual-programming tool can provide multi-layer or multi-step code predictions, and the machine-learning assisted visual-programming tool can present the multi-layer or multi-step code predictions as chains of nodes to the developer. The developer can choose to accept just one node—the next immediate layer or step—or, the developer can choose to accept a series or chain of nodes from multiple layers encompassing multiple steps. The machine-learning assisted visual-programming tool can continuously update the code predictions provided as the developer accepts or corrects certain of the suggested nodes.

In at least one example, through interactions with a graphical-user interface associated with the machine-learning assisted visual-programming tool, the developer can indicate focus on a chain of nodes under consideration for acceptance by dragging a user-interface element over a series of connected nodes using a gliding gesture, for example, a mouse with a mouse button pressed, a touch input without lifting from the input surface, etc. The developer can indicate acceptance of the chain of nodes by releasing the pressed mouse button over the last node in the chain that the developer is accepting. In various examples, the machine-learning assisted visual-programming tool can show potential future code predictions corresponding to the accepted nodes and/or suggested nodes across multiple layers. The machine-learning assisted visual-programming tool can present the further layers or steps with lighter shading, dimmed, fainter, etc. to indicate a lesser confidence in likelihood of the suggestions the further the node is from nodes to which the developer has committed. In contrast, existing visual programming editors present suggestions one node at a time and require users to accept the suggestions one node at a time.

FIG. 1 illustrates an example operating environment for machine-learning assisted autocomplete in visual programming in accordance with examples described herein.

The example environment 100 can be used by any number of video-game players 102(1)-102(n) with their associated client devices 104(1)-104(n). In various instances client devices 104(1)-104(n) can connect to gaming system(s) 106, which can include online gaming system(s) and/or offline gaming system(s), that can facilitate game play among and between video-game players, receive feedback from client devices 104(1)-104(n), and provide updates to video-game software on client devices 104(1)-104(n), etc. As illustrated, gaming system(s) 106 can be connected to one or more visual-programming system(s) 108, which one or more developer(s) 110 can use to create development program code. Examples include games and/or other programs in development, whether the games and/or other programs in development are brand new games and/or other programs, updates to existing games, and/or new versions of existing games and/or other programs. Visual-programming system(s) 108 has one or more associated datastore(s). The datastore(s) 112 store datasets that developers 110 can access to develop and/or improve video games and/or other programs using a machine-learning assisted visual-programming tool associated with the visual-programming system(s) 108. In various examples, these video games and/or other programs and improvements can be provided to client devices 104(1)-104(n) directly from visual-programming system(s) 108 and/or via gaming system(s) 106.

According to some examples, datastore(s) 112 can store a variety of programs 114 including games or other programs, which can be represented as multi-layer trees 116. These multi-layer trees 116 can be analogous to a machine-learning model and can visually correspond to backend code. Various types of graphs can represent all or part of multi-layer trees 116 including those known from graph theory such as finite and infinite graphs, and/or directed graphs, etc. Properties of the types of graphs can be employed by machine-learning assisted autocomplete algorithm(s) described herein to provide code options that can assist the developer using the machine-learning assisted visual-programming tool and avoid the unwieldly lists of previous solutions. The illustrated example program 114 includes game-1 118. As shown, game-1 118 includes a variety of attributes such as node data 120, connection data 122, and heuristics data 124, though these are but a few examples. In the illustrated example, a node from node data 120 can correspond to a vertex in one or more of the multi-layer trees 116, while a connection from connection data 122 can correspond to a logical connection, sometimes termed a link or an edge, between vertices in one or more of the multi-layer trees 116. Meanwhile, a heuristic from heuristics data 124 can include heuristics corresponding to a graph type of one or more of the multi-layer trees 116, properties associated with game-1 118 such as game genre, game-play similarity, etc. and/or characteristics of a developer 110 authorized to access game-1 118. Characteristics of the developer can include user role, e.g., engineer, game-play designer, audio-effects designer, visual-effects designer, artist, etc. Developers can have multiple roles. In some examples, machine-learning component(s) can automatically identify characteristics of the developer based on logon information and/or by accessing a related datastore, e.g., an employee record, etc. Although their details are omitted for brevity, any number of games or other programs can be included in program(s) 114 including game-2 126 through game-n 128, which can each have associated attributes like those shown for game-1 118.

Developers 110 can use machine-learning assisted autocomplete in a visual-programming tool associated with visual-programming system(s) 108 to automatically improve predictions provided via a visual-programming graphical-user interface. The multi-layer trees 116 associated with a plurality of programs 114 can be leveraged by machine learning components to extend autocomplete and improve coding efficiency and discovery including in a visual-programming graphical-user interface. Visual-programming system(s) 108 can use a plurality of proprietary and/or commercially available machine-learning components, such as those available through MICROSOFT AZURE and/or other providers, to improve code prediction and facilitate certain gesture-based interactions that developers 110 can use to accept code suggestions in a machine-learning assisted visual-programming tool. Examples of machine-learning components can include semantic segmentation, classification networks, Multilayer Perceptrons (MLP), deep neural networks (DNN), convolutional neural networks (CNN), Long Short-Term Memory (LSTM) and/or other types of recurrent neural networks (RNN), recurrent and convolutional neural networks (R-CNN) and/or other types of hybrid neural networks. A machine-learning component can operate on variety of features or heuristics within one or more sematic segmentation neural network types. In examples with a single sematic segmentation neural network type, a machine-learning component can operate on variety of features or heuristics by using different network architectures (such as Hourglass, UNet, SegNet, SpineNet, etc.) and/or by varying a number of features or heuristics per neural network type. Machine-learning components can also include light-weight models such as decision trees, random forest, Bayesian networks, or any suitable predictive models to generate multi-layer trees 116.

Figure 2:
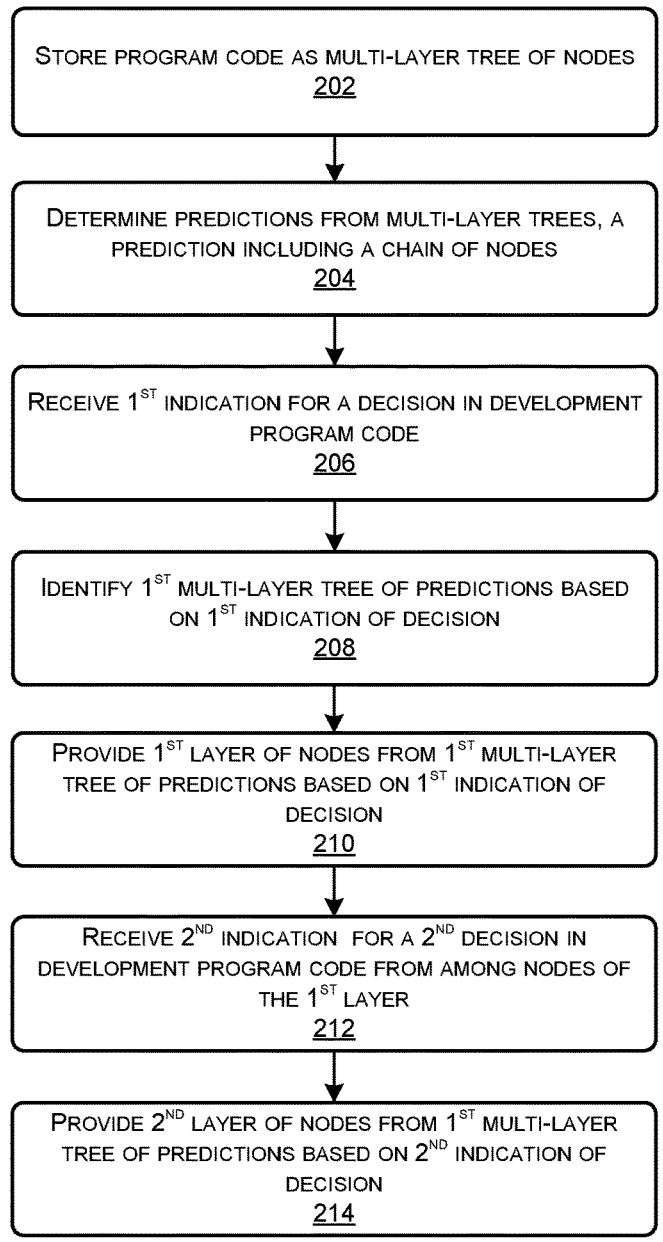
FIG. 2 illustrates a flow diagram of an example method of machine-learning assisted autocomplete in visual programming as described herein.

FIG. 2 illustrates a flow diagram of an example method 200 of machine-learning assisted autocomplete in visual programming as described herein.

At block 202, a machine-learning assisted visual-programming tool associated with the visual-programming system 108 can cause a datastore 112 to store program code as a multi-layer tree of nodes, which can be included in multi-layer trees 116. In various examples, a logical connection between nodes can signify a relationship between at least one node of a first layer and one or more nodes of an adjacent second layer of the multi-layer tree.

At block 204, a machine-learning assisted visual-programming tool associated with visual-programming system 108 can determine a plurality of multi-layer trees of predictions from the multi-layer trees 116 based on the multi-layer tree of nodes. In various examples, individual multi-layer trees of predictions of the plurality of multi-layer trees of predictions include at least one chain of nodes formed with logical connections between layers of the individual multi-layer tree of predictions.

At block 206, a machine-learning assisted visual-programming tool associated with visual-programming system 108 can receive an indication corresponding to a decision in development program code. For example, the indication of the decision can include selection of a code option from code predictions provided via a graphical-user interface associated with the visual-programming system 108.

At block 208, a machine-learning assisted visual-programming tool associated with visual-programming system 108 can identify a first multi-layer tree of predictions of the plurality of multi-layer trees of predictions based on the indication of the decision, thereby limiting the associated number of code option predictions to be provided via the graphical-user interface associated with the visual-programming system 108.

At block 210, a machine-learning assisted visual-programming tool associated with visual-programming system 108 can provide at least part of one or more layers of nodes from the first multi-layer tree of predictions based on the indication of the decision. The one or more layers of nodes can be provided via the graphical-user interface associated with the visual-programming system 108 in such a way that the developer 110 can quickly discern between nodes in a layer and can see nodes in further layers associated with the nodes in the current layer. In various examples, the nodes in further layers can be presented dimmer, fainter, or in silhouette compared to those in the first layer.

At block 212, a machine-learning assisted visual-programming tool associated with visual-programming system 108 can receive an indication corresponding to another decision in development program code. This decision can represent a decision among nodes of the first layer of the first multi-layer tree of predictions.

At block 214, a machine-learning assisted visual-programming tool associated with visual-programming system 108 can provide at least part of a second layer of nodes from the first multi-layer tree of predictions based on the indication of the decision at block 212. The second layer of nodes may have already been provided via the graphical-user interface associated with the visual-programming system 108 in the event that more than one layer of nodes was provided via the graphical user interface at 210. In that case, presentation of the second layer of nodes at block 214 can include brightening, making less faint, and/or making more opaque at least some of the second layer of nodes. For example, those nodes still valid for selection given the decision indicated at block 212 can be brightened, made opaque, etc. while those no longer valid can be designated as not available by being blacked-out, marked with an "X", colored red, etc.

Figure 3:
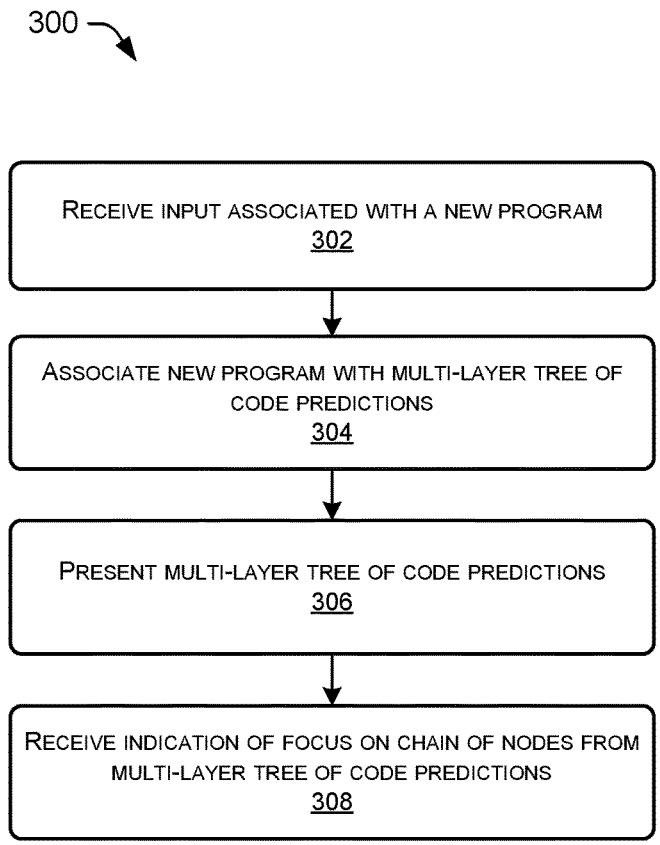
FIG. 3 illustrates a flow diagram of an example method of machine-learning assisted autocomplete in visual programming as described herein.

FIG. 3 illustrates a flow diagram of an example method 300 of machine-learning assisted autocomplete in visual programming as described herein. Method 300 can be include operation of a visual-programming tool that is associated with a graphical-user interface and an input interface associated with visual-programming system 108. The visual programming tool can be used by a plurality of developers 110.

At block 302, a machine-learning assisted visual-programming tool associated with visual-programming system 108 can receive an input associated with a development program, e.g., a new program, a new game, a program update, a game update, etc.

At block 304, a machine-learning assisted visual-programming tool associated with visual-programming system 108 can associate the development program with a multi-layer tree of code predictions from multi-layer trees 116. The multi-layer tree of code predictions can include one or more nodes in a plurality of layers arranged so that a node in a particular layer has a logical connection to one or more nodes in further layers. In various examples, the number of nodes connected to a node in a particular layer can be governed by a type of graph associated with the particular multi-layer tree of code predictions. The multi-layer tree of code predictions can provide flexible chains of nodes. A chain of nodes includes connected nodes from two or more layers from the multi-layer tree of code predictions.

At block 306, a machine-learning assisted visual-programming tool associated with visual-programming system 108 can provide the multi-layer tree of code predictions, or at least part of the multi-layer tree of code predictions, for presentation via the associated graphical-user interface. In examples, when part of the multi-layer tree of code predictions is presented, the part includes at least one node from at least two layers of the multi-layer tree of code predictions. When the at least one node from at least two layers of the multi-layer tree of code predictions are connected, they represent a chain of nodes.

At block 308, a machine-learning assisted visual-programming tool associated with visual-programming system 108 can receive an indication of focus on a chain of nodes from the presented multi-layer tree of code predictions. The indication of focus can be from dragging a user-interface element in a gliding gesture, such as dragging a mouse with a mouse button pressed, dragging a touch over a touch screen without lifting the device or finger causing touch input from the touch screen, etc.

Figure 4:
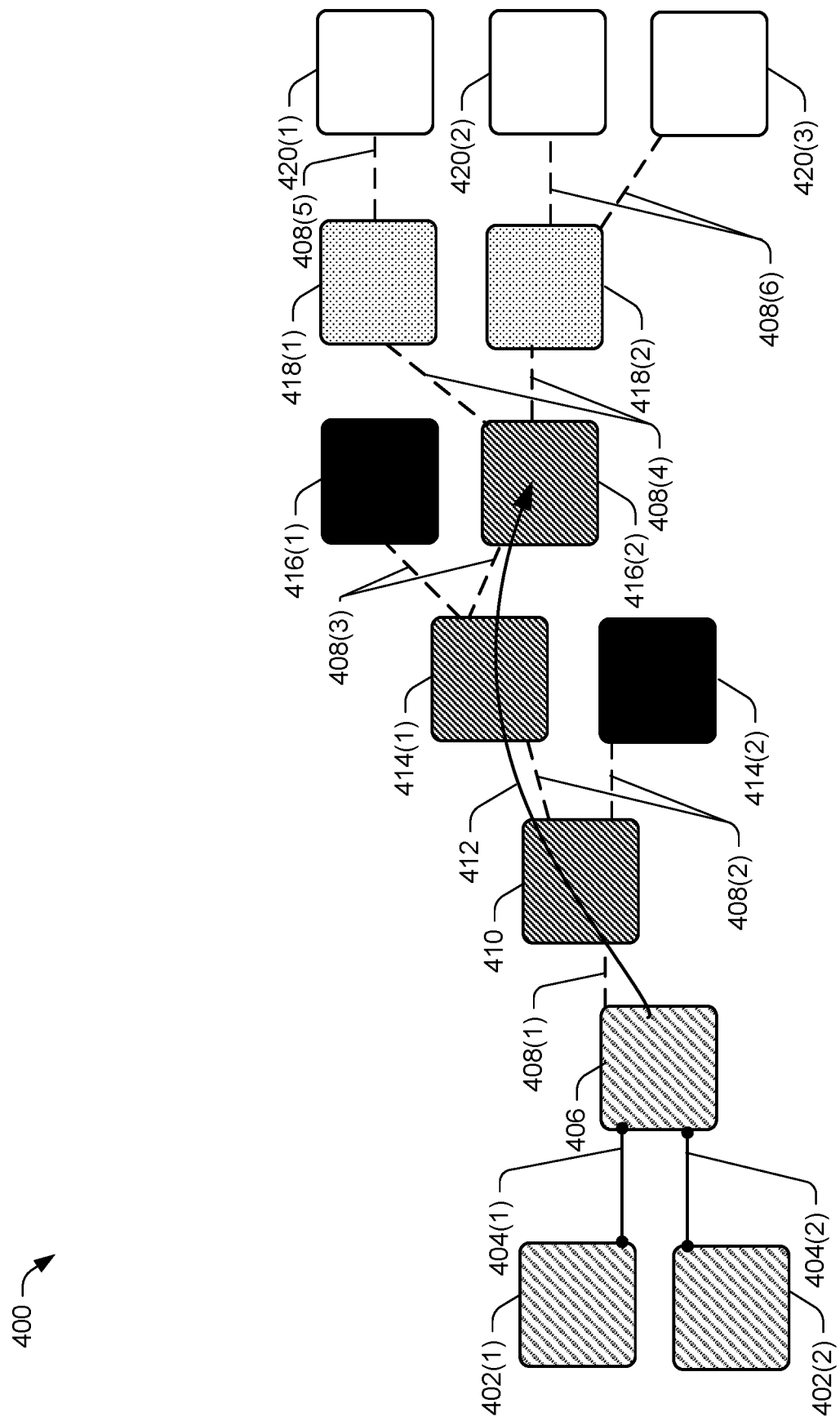
FIG. 4 illustrates an example graphical-user interface of a visual-programming tool incorporating machine-learning assisted autocomplete as described herein.

FIG. 4 illustrates an example graphical-user interface 400 associated with a visual-programming tool incorporating machine-learning assisted autocomplete as described herein. In the illustrated example, blocks represent code options provided corresponding to some nodes in a graph corresponding to a multi-layer tree of code predictions. The connecting lines represent the logical connections, edges or links between the nodes. In the illustrated example, blocks 402(1) and 402(2) have logical connections 404(1) and 404(2), respectively that connect to block 406. The pattern of blocks 402(1), 402(2), and 406 and the solid presentation of connections 404(1) and 404(2) indicate that the code associated with blocks 402(1), 402(2), and 406 has been accepted by the developer.

Dashed connecting line 408(1), which connects block 406 and block 410, shows that the code represented by block 410 is an available option from the multi-layer tree of code predictions based on the already accepted blocks. Since block 410 has not yet been accepted, block 410 and connecting line 408(1) are presented with different patterns than the accepted blocks with their linking connectors. In the illustrated example, block 410 can represent a node from a first layer of a multi-layer tree of code predictions.

Dashed connecting lines 408(2) link the node of the first layer to nodes, (i.e., block 410), to nodes of a second layer of a multi-layer tree of code predictions. Dashed connecting lines 408(3) link a node of the second layer to nodes of a third layer of a multi-layer tree of code predictions. Dashed connecting lines 408(4) link a node of the third layer to nodes of a fourth layer of a multi-layer tree of code predictions. Dashed connecting line 408(5) links a node of the fourth layer to a node of a fifth layer of a multi-layer tree of code predictions. Meanwhile, dashed connecting lines 408(6) also link a node of the fourth layer to nodes of a fifth layer of a multi-layer tree of code predictions. Each of these dashed connecting lines represent logical connections to code options valid for selection from the multi-layer tree of code predictions.

Arc 412 represents a developer focusing on the options represented by blocks 410, 414(1), and 416(2) as a chain of nodes by dragging a user-interface element over the blocks. Arc 412 illustrates that, starting from block 406, the input interface can receive an indication of selection, (e.g., a mouse-button press, a touch input, etc.), that can be held while the developer glides the input device, (e.g., mouse, touch input device, finger, etc.), from the left of the graphical-user interface over block 410 in the first layer, block 414(1) in the second layer, and block 416(2) in the third layer. In the example graphical-user interface 400, the developer has not yet accepted this chain of nodes by releasing the mouse button, touch from a touch screen, etc. Thus, the connecting lines 408(2) and 408(3) are still dashed and the pattern of blocks 410, 414(1), and 416(2) has not been revised to match the pattern of the accepted blocks. When the developer accepts a block or chain of blocks, for example by releasing a pressed mouse button, removing touch from the touch screen, etc., connecting lines 408(2) and 408(3) will become solid connections like connections 404(1) and 404(2) and blocks 414(1) and 416(2) will be presented like blocks 402(1), 402(2), and 406. Meanwhile, because of arc 412 going over block 414(1), block 414(2) is blacked out. Similarly, because of arc 412 going over block 416(2), block 416(1) is blacked out. In various examples, the blacked-out blocks could be presented with an "X", colored red, etc. In the illustrated example, the blacked-out blocks indicate that these code options are not a part of the selected chain of nodes, or the chain of nodes upon which the developer is focused. Since the developer has not yet accepted the chain of nodes, the developer can extend the chain to one of blocks 418(1) or 418(2) in the fourth layer of nodes. And, depending on which block the developer chooses at the fourth layer, follow connecting line 408(5) to block 420(1) from the fifth layer of nodes or one or connecting lines 408(6) to select block 420(2) or block 420(3) from the fifth layer of nodes. Until the developer releases the mouse button, the chain can be extended to accept nodes from further presented layers. Also, in various examples, since the developer has not yet accepted the chain of nodes, the developer can reverse arc 412, which can cause block(s) 416(1) and/or block 414(2) to become available again. In the event that the developer shifted the arc 412 to either block 416(1) or block 414(2), the graphical-user interface can shift to present nodes connected to those code options, and the alternative block, i.e., 416(2) or block 414(1) would be presented blacked out, with an "X", colored red, etc.

In the example graphical-user interface 400, the blocks further from accepted blocks are presented in a way that suggests the autocomplete algorithm associates a lower level of confidence with the corresponding code option from the multi-layer tree of code predictions. For example, the blocks having focus designated by arc 412 are presented with a certain pattern, while the blocks at the fourth level, 418(1) and 418(2) have a different pattern, and the blocks at the fifth level, 420(1), 420(2), and 420(3) have an even different pattern. In various implementations the fill patterns can be replaced dimmer, fainter, more transparent, or with other differences. Similarly, the blacked-out presentation of blocks not a part of the chain of nodes though still having potential for selection at that layer can be presented with an "X" and/or a red color, etc. while the blocks in the chain can be presented brighter, more opaque, with a green color, etc.—many variations are possible.

Figure 5:
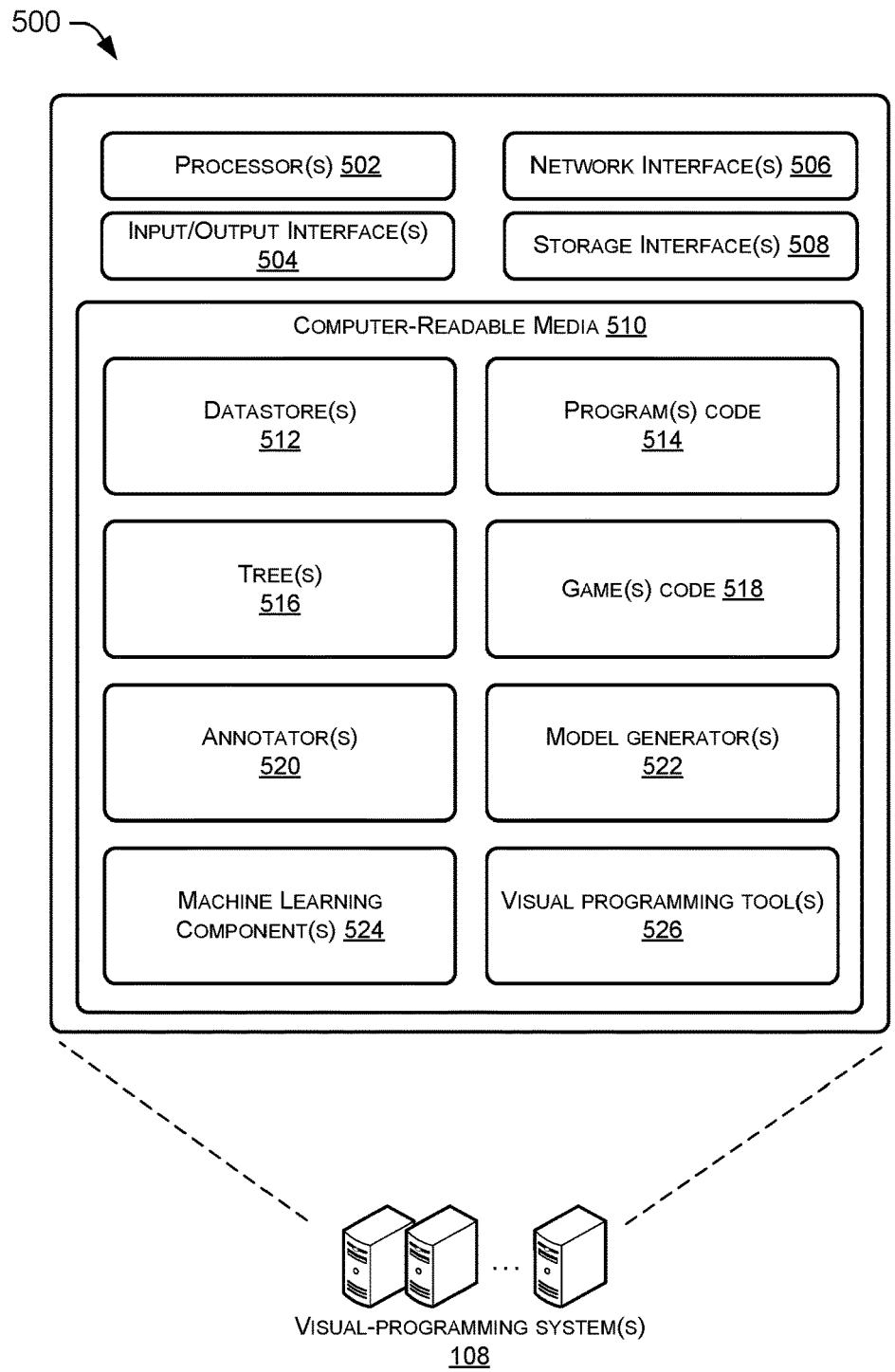
FIG. 5 illustrates a block diagram of an example visual-programming system that can implement machine-learning assisted autocomplete, in accordance with examples described herein.

FIG. 5 illustrates a block diagram of example computing device(s) 500 of visual-programming system(s) 108 that can implement machine-learning assisted autocomplete, in accordance with examples described herein.

The computing device(s) 500 can include one or more processor(s) 502, one or more input/output (I/O) interface(s) 504, one or more network interface(s) 506, one or more storage interface(s) 508, and computer-readable media 510.

In various examples, the processors(s) 502 can include one or more of a central processing unit (CPU), a graphics processing unit (GPU), a microprocessor, a digital signal processor, and/or other processing units or components. Alternatively, or in addition, the processing described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each processor(s) 502 can possess its own local memory, which also can store programs, program data, and/or one or more operating systems. Furthermore, the one or more processor(s) 502 can include one or more cores.

The one or more input/output (I/O) interface(s) 504 can enable the computing device(s) 500 of visual-programming system(s) 108 to detect interaction with a developer 110 and/or other computing system(s). The I/O interface(s) 504 can include a combination of hardware, software, and/or firmware and can include software drivers for enabling the operation of any variety of I/O device(s) integrated on the computing device(s) 500 of visual-programming system(s) 108 or with which computing device(s) 500 of visual-programming system(s) 108 interact, such as displays, microphones, mouse-input devices, pen-input devices or touch-input devices, speakers, cameras, switches, and any other variety of sensors, or the like. In various examples, the I/O devices of the computing device(s) 500 of visual-programming system(s) 108 can include touch, audio, video, and/or other input functionality.

The network interface(s) 506 can enable the computing device(s) 500 of visual-programming system(s) 108 to communicate via the one or more network(s). The network interface(s) 506 can include a combination of hardware, software, and/or firmware and can include software drivers for enabling any variety of protocol-based communications, and any variety of wireline and/or wireless ports/antennas. For example, the network interface(s) 506 can include one or more of a cellular radio, a wireless (e.g., IEEE 802.1x-based) interface, a Bluetooth® interface, and the like. In some examples, the network interface(s) 506 can connect to the Internet. The network interface(s) 506 can further enable the computing device(s) 500 of visual-programming system(s) 108 to communicate over circuit-switch domains and/or packet-switch domains.

The storage interface(s) 508 can enable the processor(s) 502 to interface and exchange data with computer-readable media 510, as well as any storage device(s) external to the computing device(s) 500 of visual-programming system(s) 108, such as if datastore 112 is implemented in separate computing device(s) associated with visual-programming system(s) 108. The storage interface(s) 508 can further enable access to removable media.

The computer-readable media 510 can include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 510 can be implemented as computer-readable storage media (CRSM), which may be any available physical media accessible by the processor(s) 502 to execute instructions stored on the computer-readable media 510. In one implementation, CRSM can include random access memory (RAM) and Flash memory. In some implementations, CRSM can include, but is not limited to, read-only memory (ROM), electrically erasable programmable read-only memory (EEPROM), or any other tangible medium which can be used to store the desired information, and which can be accessed by the processor(s) 502. The computer-readable media 510 can have an operating system (OS) and/or a variety of suitable applications stored thereon. The OS, when executed by the processor(s) 502 can enable management of hardware and/or software resources of the computing device(s) 500 of visual-programming system(s) 108.

Several functional blocks having instruction, data stores, and so forth can be stored within the computer-readable media 510 and configured to execute on the processor(s) 502. The computer-readable media 510 can have stored thereon a datastore(s) 512, which can correspond to datastore 112, program code(s) 514, which can correspond to program(s) 114, tree(s) 516, which can correspond to multi-layer trees 116, game(s) code 518, which can correspond to game-1 118 through game(n) 128, annotator(s) 520, model generator(s) 522, any number and/or type of machine-learning component(s) 524, and associated visual-programming tools 526. It will be appreciated that each of the blocks 512, 514, 516, 518, 520, 522, 524, and 526 can include instructions that when executed by the processor(s) 502 enable various functions pertaining to the operations of the computing device(s) 500 of visual-programming system(s) 108. It should further be noted that one or more of the functions associated with blocks 512, 514, 516, 518, 520, 522, 524, and 526 can operate separately or in conjunction with each other.

The instructions stored in datastore 512, when executed by processor(s) 502, can configure computing device(s) 500 of visual-programming system(s) 108 to allow machine-learning assisted visual-programming tools to access existing program(s), which can be represented as multi-layer trees and attributes of associated program(s), (e.g., games), including node data, connection data, and/or heuristics data, etc.

The instructions stored in program(s) code 514, when executed by processor(s) 502, can configure computing device(s) 500 of visual-programming system(s) 108 to allow machine-learning assisted visual-programming tools to access and analyze existing program(s), which can be represented as multi-layer trees and attributes of associated program(s), (e.g., games), including node data, connection data, and/or heuristics data, etc.

The instructions stored in tree(s) 516, when executed by processor(s) 502, can configure computing device(s) 500 of visual-programming system(s) 108 to allow machine-learning assisted visual-programming tools to traverse multi-layer trees according to attributes of associated program(s), (e.g., games), including node data, connection data, and/or heuristics data, etc.

The instructions stored in game(s) code 518, when executed by processor(s) 502, can configure computing device(s) 500 of visual-programming system(s) 108 to allow machine-learning assisted visual-programming tools to access attributes of games, including node data, connection data, and/or heuristics data, etc.

The instructions stored in annotator 520, when executed by computing device(s) 500, can configure computing device(s) 500 of visual-programming system(s) 108 to allow machine-learning assisted visual-programming tools to receive information about detected, identified, and/or generated code objects and their associated features or heuristics and to generate training data therefrom. This training data can include one or more parameter values associated with a code object and/or feature/heuristic, e.g., an input parameter type, and output result type, heuristic data associated with program and/or game properties, developer user role data and/or other characteristics, etc.

The instructions stored in model generator 522, when executed by processor(s) 502, can configure computing device(s) 500 of visual-programming system(s) 108 to allow machine-learning assisted visual-programming tools to generate multi-layer trees of code predictions. In some examples, these predictive models can be generated by the computing device(s) 500 of visual-programming system(s) 108. In other example embodiments, other systems, such as dedicated machine learning and/or heuristics systems can provide all or part of these modeling services. The predictive models can be any suitable type of predictive model, such as any variety of machine learning model corresponding to the variety of machine-learning components described herein, e.g., a logistic regression model, a neural network model, etc.

The instructions stored in machine-learning component(s) 524, when executed by processor(s) 502, can configure computing device(s) 500 of visual-programming system(s) 108 to use data structures and logic to process program data from existing programs and/or games to facilitate machine-learning assisted autocomplete in visual programming. Machine-learning component(s) 524 can include a variety of types such as semantic segmentation, classification networks, Multilayer Perceptrons (MLP), deep neural networks (DNN), convolutional neural networks (CNN), Long Short-Term Memory (LSTM) and/or other types of recurrent neural networks (RNN), recurrent and convolutional neural networks (R-CNN) and/or other types of hybrid neural networks. A machine-learning component can operate on variety of features or heuristics within one or more sematic segmentation neural network types. In examples with a single sematic segmentation neural network type, a machine-learning component can operate on variety of features or heuristics by using different network architectures (such as Hourglass, UNet, SegNet, SpineNet, etc.) and/or by varying a number of features or heuristics per neural network type. Since each neural network has limited internal learning capabilities and/or resources, a machine-learning component as described herein can increase precision per requested feature(s). The visual-programming system described herein can use many separate simple augmented networks to leverage multi-processor architecture and parallelization of processing. In various examples, simple augmented networks can include one-feature, two-feature, three-feature, etc. networks. Machine-learning components can also include light-weight models such as decision trees, random forest, Bayesian networks, or any other suitable predictive models.

The instructions stored in visual-programming tool(s) 526, when executed by processor(s) 502, can configure computing device(s) 500 of visual-programming system(s) 108 to provide code options from machine-learning assisted autocomplete for presentation in a visual programming environment.

The illustrated aspects of the claimed subject matter can be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams need not necessarily be performed in the order presented or need not necessarily be performed at all, according to some examples of the disclosure.

Computer-executable program instructions can be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer-program instructions can also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. Examples of the disclosure provide for a computer program product, comprising a computer usable medium having a computer-readable program code or program instructions embodied therein, the computer-readable program code adapted to be executed to implement one or more functions specified in the flow diagram block or blocks. The computer-program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database can be transmitted to a centralized database capable of receiving data, information, or data records from more than one database or other data storage devices. In some embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims. Although specific terms are employed herein, they are used in a generic and descriptive sense only and not for purposes of limitation unless specifically defined herein.

What is claimed is:

1. A computer-implemented method implementing a visual-programming system, the computer-implemented method comprising:
    storing, in cloud storage, shared program code accessible via a visual-programming tool incorporating machine-learning assisted autocomplete as a multi-layer tree of nodes with a logical connection signifying a relationship between at least one node of a first layer of the multi-layer tree of nodes and at least one node of a second layer of the multi-layer tree of nodes;

determining, via the visual-programming system and based at least on a machine-learning component of the visual-programming tool operating on heuristics of the multi-layer tree of nodes, a plurality of multi-layer trees of predictions based on the multi-layer tree of nodes accessed via the cloud storage, wherein individual multi-layer trees of predictions of the plurality of multi-layer trees of predictions include at least one chain of nodes formed with logical connections between layers of the individual multi-layer tree of predictions;

receiving, via a graphical user interface (GUI) associated with the visual-programming tool, a first indication corresponding to a first decision in development program code;

determining, based on a machine learning model associated with the visual-programming tool and the visual-programming system, a first multi-layer tree of code predictions of the plurality of multi-layer trees of predictions based on the first indication of the first decision received at the GUI;

providing, via the GUI associated with the visual-programming tool, at least a first layer of nodes of the first multi-layer tree of code predictions based on the first indication of the first decision;

determining, via the visual-programming tool, at least a first node of the first layer of nodes associated with the first indication;

providing, via the GUI associated with the visual-programming tool, at least a first visual marking of a presentation of at least one node including the first node of the first layer of nodes that corresponds to the first decision;

receiving, via the GUI associated with the visual-programming tool, a second indication corresponding to a second decision in the development program code, the second decision being made from among the nodes of the first layer of the first multi-layer tree of code predictions;

providing, via the GUI associated with the visual-programming tool, at least a second layer of nodes of the first multi-layer tree of code predictions based on the second indication of the second decision;

determining, via the visual-programming tool, at least a second node of the second layer of nodes associated with the second indication;

providing, via the GUI associated with the visual-programming tool, at least a second visual marking of the presentation of at least one node including the second node of the second layer of nodes that corresponds to the second decision; and wherein:

the at least one chain of nodes includes a first chain of nodes that includes the first node and the second node; and responsive to receiving an indication of acceptance of the at least one chain of nodes, the GUI is further configured to cause presentation of one or more alternative nodes in subsequent layers of the multi-layer tree of predictions in the GUI, the presentation of the one or more alternative nodes including at least one of:

brightened according to an increasing level of certainty that the one or more alternative nodes can be a part of the chain; or dimmed according to a decreasing level of certainty that the one or more alternative nodes will be a part of the chain.

2. The computer-implemented method of claim 1, further comprising:

identifying, by the machine-learning component of the visual-programming tool, a type of graph associated with the multi-layer tree of nodes; and wherein the machine-learning component of the visual-programming tool associates the first multi-layer tree of code predictions with the type of graph.

3. The computer-implemented method of claim 1, wherein at least part of the development program code is associated with programs including games, the computer-implemented method further comprising:

identifying, by the machine-learning component of the visual-programming tool, a plurality of games having a similarity in game play;

determining, by the machine-learning component of the visual-programming tool, that the development program code has the similarity; and wherein the machine-learning component of the visual-programming tool associates the first multi-layer tree of code predictions with the similarity.

4. The computer-implemented method of claim 1, wherein at least part of the development program code is associated with programs including games, the computer-implemented method further comprising:

identifying, by the machine-learning component of the visual-programming tool, a game genre associated with the development program code; and wherein the machine-learning component of the visual-programming tool associates the first multi-layer tree of code predictions with the game genre.

5. The computer-implemented method of claim 1, further comprising:

identifying, by the machine-learning component of the visual-programming tool, a role of a developer associated with the first indication; and wherein the machine-learning component of the visual-programming tool associates the first multi-layer tree of code predictions with the role of the developer.

6. The visual-programming tool configured to perform a method as claim 1 recites, the visual-programming tool comprising:

the GUI configured to present the multi-layer tree of predictions corresponding to at least a part of the multi-layer tree of nodes;

an input interface configured to receive input from one or more users of the visual-programming tool;

responsive to receiving input associated with the first decision in the development code via the input interface, the GUI configured to present the multi-layer tree of predictions in the GUI of the visual-programming tool; and the input interface configured to receive an indication of focus on the chain of nodes among nodes of the multi-layer tree of predictions.

7. The visual-programming tool of claim 6, wherein the GUI is further configured to change presentation of the multi-layer tree of predictions responsive to receiving the indication of focus on the chain of nodes.

8. The visual-programming tool of claim 6, wherein:
the input interface is further configured to receive an indication of acceptance of a chain of nodes of the multi-layer tree of predictions via an input associated with the GUI; and
responsive to receiving the indication of acceptance of the chain of nodes, the GUI is further configured to cause presentation of one or more alternative nodes in subsequent layers of the multi-layer tree of predictions in the GUI, the presentation of the one or more alternative nodes including at least one of:
designated valid according to a determination that the one or more alternative nodes can be a part of the chain; or
designated invalid according to a determination that the one or more alternative nodes cannot be a part of the chain.

9. The visual-programming tool of claim 6, wherein the input interface is further configured to recognize focus on the chain of nodes being indicated by maintenance of a mouse-button press while a mouse is dragged over the chain of nodes.

10. The visual-programming tool of claim 9, wherein the input interface is further configured to recognize acceptance of the chain of nodes being indicated by finishing the mouse drag with release of the mouse-button press over a selected node of the chain of nodes.

11. The computer-implemented method of claim 1, wherein the machine-learning component of the visual programming tool operates on program code features including at least one of input parameter type or output result type.

12. The computer-implemented method of claim 1, further comprising:
determining, via the visual-programming tool, a first connecting line linking the first node with the second node in the chain of nodes;
providing, via the GUI associated with the visual-programming tool, a visual marking of the first connecting line;
receiving, via the GUI associated with the visual-programming tool, a third indication corresponding to a selection of the first chain of nodes; and
changing the visual marking of the first connecting line provided via the GUI to represent the selection.

13. A system comprising:
one or more processors;
one or more computer-readable media storing computer-executable instructions that, when executed by the one or more processors, configure the system to perform operations comprising:
storing, in cloud storage, shared program code accessible via a visual-programming tool incorporating machine-learning assisted autocomplete as a multi-layer tree of nodes with a logical connection signifying a relationship between at least one node of a first layer of the multi-layer tree of nodes and at least one node of a second layer of the multi-layer tree of nodes;
determining, at a visual-programming system and based at least on a machine-learning component of the visual-programming tool operating on heuristics of the multi-layer tree of nodes, a plurality of multi-layer trees of predictions based on the multi-layer tree of nodes, wherein individual multi-layer trees of predictions of the plurality of multi-layer trees of predictions include at least one chain of nodes formed with logical connections between layers of the individual multi-layer tree of predictions;
receiving, via a graphical user interface (GUI) associated with the visual-programming tool:
a first indication corresponding to a first decision in development program code;
determining, based on a machine learning model associated with the visual-programming tool and the visual-programming system, a first multi-layer tree of code predictions of the plurality of multi-layer trees of predictions based on the first indication of the first decision received at the GUI;
providing, via the GUI associated with the visual-programming tool, at least a first layer of nodes of the first multi-layer tree of code predictions based on the first indication of the first decision;
determining, via the machine-learning component, at least a first subset of the first layer of nodes not associated with the first indication;
providing, via the GUI associated with the visual-programming tool, at least a first visual marking of a presentation of at least one node of the first layer of nodes that corresponds to the first decision;
receiving, via the GUI associated with the visual-programming tool, a second indication corresponding to a second decision in the development program code, the second decision being made from among the nodes of the first layer of the first multi-layer tree of code predictions;
providing, via the GUI associated with the visual-programming tool, at least a first subset of the second layer of nodes of the first multi-layer tree of code predictions based on the second indication of the second decision, wherein the second indication represents focus on a second part of the chain of nodes from the first multi-layer tree of predictions;
determining, via the machine-learning component, at least a second subset of the second layer of nodes not associated with the second indication; and
providing, via the GUI associated with the visual-programming tool, at least a second visual marking of the presentation of at least one node of the second layer of nodes that corresponds to the second decision; and
wherein:
the at least one chain of nodes includes a first chain of nodes that includes the first node and the second node; and
responsive to receiving the second indication, the GUI is further configured to cause presentation of one or more alternative nodes in subsequent layers of the multi-layer tree of predictions in the GUI, the presentation of the one or more alternative nodes including at least one of:
brightened according to an increasing level of certainty that the one or more alternative nodes can be a part of the chain; or
dimmed according to a decreasing level of certainty that the one or more alternative nodes will be a part of the chain.

14. The system of claim 13, the one or more computer-readable media storing computer-executable instructions that, when executed by the one or more processors, configure the system to perform operations further comprising:
identifying, by the machine-learning component of the visual-programming tool, a type of graph associated with the multi-layer tree of nodes; and
wherein the machine-learning component of the visual-programming tool associates the first multi-layer tree of code predictions with the type of graph.

15. The system of claim 13, wherein at least part of the development program code is associated with programs including games, the one or more computer-readable media storing computer-executable instructions that, when executed by the one or more processors, configure the system to perform operations further comprising:
- identifying, by the machine-learning component of the visual-programming tool, a plurality of games having a similarity in game play;
- determining, by the machine-learning component of the visual-programming tool, that the development program code shares the similarity; and
- wherein the machine-learning component of the visual-programming tool associates the first multi-layer tree of code predictions with the similarity.

16. The system of claim 13, wherein at least part of the development program code is associated with programs including games, the one or more computer-readable media storing computer-executable instructions that, when executed by the one or more processors, configure the system to perform operations further comprising:
- identifying, by the machine-learning component of the visual-programming tool, a game genre associated with the development program code; and
- wherein the machine-learning component of the visual-programming tool associates the first multi-layer tree of code predictions with the game genre.

17. The system of claim 13, the one or more computer-readable media storing computer-executable instructions that, when executed by the one or more processors, configure the system to perform operations further comprising:
- identifying, by the machine-learning component of the visual-programming tool, a role of a developer associated with the first indication; and
- wherein the machine-learning component of the visual-programming tool associates the first multi-layer tree of code predictions with the role of the developer.

18. The system of claim 13, wherein the first indication represents focus on a node from the first layer of nodes as part of a chain of nodes from the first multi-layer tree of code predictions;
- the GUI is configured to change presentation of the first multi-layer tree of predictions responsive to receiving the indication of focus on the node from the first layer of nodes as part of the chain of nodes; and
- the second indication includes representation of acceptance of the chain of nodes including the node from the first layer of nodes and a node from the second layer of nodes from the first multi-layer tree of predictions.

19. The system of claim 13, the one or more computer-readable media storing computer-executable instructions that, when executed by the one or more processors, configure the system to perform operations further comprising:
- determining, via the visual-programming tool, a first connecting line linking the first node with the second node in the chain of nodes;
- providing, via the GUI associated with the visual-programming tool, a visual marking of the first connecting line;
- receiving, via the GUI associated with the visual-programming tool, a third indication corresponding to a selection of the first chain of nodes; and
- changing the visual marking of the first connecting line provided via the GUI to represent the selection.

20. The system of claim 13, the one or more computer-readable media storing computer-executable instructions that, when executed by the one or more processors, configure the system to perform operations wherein:
- the GUI is configured to present the first multi-layer tree of predictions corresponding to at least a part of the multi-layer tree of nodes;
- an input interface is configured to receive input from one or more users of the visual-programming tool;
- responsive to receiving input associated with the first decision in the development code via the input interface, the GUI is configured to present the first multi-layer tree of predictions in the GUI of the visual-programming tool;
- the input interface is configured to receive an indication of focus on the chain of nodes among nodes of the first multi-layer tree of predictions;
- the input interface is further configured to receive an indication of acceptance of a chain of nodes of the first multi-layer tree of predictions via an input associated with the GUI; and
- responsive to receiving the indication of acceptance of the chain of nodes, the GUI is further configured to cause presentation of one or more alternative nodes in subsequent layers of the first multi-layer tree of predictions in the GUI, the presentation of the one or more alternative nodes including at least one of:
- designated valid according to a determination that the one or more alternative nodes can be a part of the chain; or
- designated invalid according to a determination that the one or more alternative nodes cannot be a part of the chain.

* * * * *